United States Patent [19]

Carroll et al.

[11] 4,261,852
[45] Apr. 14, 1981

[54] LIQUID POLYISOCYANATE COMPOSITIONS

[75] Inventors: William G. Carroll, Manchester, England; Arun Watts, Brussels, Belgium

[73] Assignee: Imperial Chemical Industries Limited, London, England

[21] Appl. No.: 80,324

[22] Filed: Oct. 1, 1979

[30] Foreign Application Priority Data

Oct. 3, 1978 [GB] United Kingdom .............. 39142/78

[51] Int. Cl.³ ...................... C08G 18/08; C08G 18/10; C09K 3/00
[52] U.S. Cl. ..................................... 528/59; 521/159; 521/160; 521/914; 521/174; 528/67; 528/76; 528/77; 528/59
[58] Field of Search .................... 528/59, 67; 521/159, 521/160, 914; 252/182

[56] References Cited

U.S. PATENT DOCUMENTS

| | | |
|---|---|---|
| 3,394,164 | 7/1968 | McClellan et al. ..................... 528/59 |
| 3,839,491 | 10/1974 | Gamero et al. .......................... 528/59 |
| 4,031,026 | 6/1977 | Ibbotson ................................. 528/59 |
| 4,055,548 | 10/1977 | Carleton et al. ........................ 528/59 |
| 4,082,703 | 4/1978 | Duffy et al. ............................. 528/67 |
| 4,143,014 | 3/1979 | McLaughlin et al. ................. 528/59 |

FOREIGN PATENT DOCUMENTS

1378975  1/1975  United Kingdom .

*Primary Examiner*—Maurice J. Welsh
*Attorney, Agent, or Firm*—Cushman, Darby & Cushman

[57] ABSTRACT

Liquid polyisocyanate compositions comprising:

(A) from 90 to 50% by weight of a reaction product of diphenylmethane diisocyanate and a polyoxyalkylene polyol having an average functionality of 2-3 comprising from 50-100% by weight of a polyoxypropylene diol or triol having a hydroxyl equivalent weight of from 750 to 3000 and from 0-50% by weight of a polyoxyethylene diol or triol having a hydroxyl equivalent weight of from 750 to 3000, said reaction product having an NCO content of from 8 to 26% by weight, and (B) from 10 to 50% by weight of a diphenylmethane diisocyanate composition containing from 30 to 65% by weight of diphenylmethane diisocyanate, the remainder being polymethylene polyphenyl polyisocyanates of functionality greater than two together with by-products formed in the manufacture of such polyisocyanates by phosgenation.

The compositions are useful in the manufacture of polyurethanes, especially cold cure flexible foams.

3 Claims, No Drawings

LIQUID POLYISOCYANATE COMPOSITIONS

This invention relates to liquid polyisocyanate compositions and in particular to compositions containing a diphenylmethane diisocyanate and to the use of such compositions in the manufacture of polyurethanes.

It is well known to manufacture polyurethanes, of a cellular or non-cellular nature, by reacting an organic polyisocyanate with an organic polyol in the presence of additives of various kinds. Many organic polyisocyanates have been proposed for use in making polyurethanes but, since many polyurethane manufacturing processes involve the rapid mixing of materials at room temperature, it is preferred to use polyisocyanates that are liquid at room temperature and that remain in the liquid state without significant deposition of solid materials even when stored at relatively low temperatures such as may be encountered in winter.

One of the polyisocyanates which has been used commercially in the manufacture of polyurethanes is diphenylmethane diisocyanate which is generally available either in a substantially pure form or in admixture with related polymethylene polyphenyl polyisocyanates of higher functionality such as may be represented by the general formula:

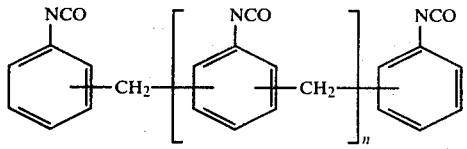

wherein n has an average value of one or more. The latter mixtures are commonly referred to in the trade as "crude MDI" and are made by the phosgenation of a mixture of polyamines obtained by the acid condensation of aniline and formaldehyde.

The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenyl polyamines of higher functionality, the precise composition depending in known manner on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates.

The relative proportions of diisocyanate, triisocyanate and higher polyisocyanates in the crude diphenylmethane diisocyanate compositions determine the average functionality of the compositions, that is the average number of isocyanate groups per molecule. By varying the proportions of starting materials, the average functionality of the polyisocyanate compositions can be varied from little more than 2 to 3 or even higher. In practice, however, the major use for these compositions has been in the manufacture of rigid polyurethane foams and the products that are commercially available usually have average functionalities suitable for that use, for example in the range 2.6 to 3.1. Such compositions contain from 30 to 65% by weight of diphenylmethane diisocyanate, the remainder being polymethylene polyphenyl polyisocyanates of functionality greater than two together with by-products formed in the manufacture of such polyisocyanates by phosgenation. These products, being liquids, are convenient to use but are not suitable for those polyurethane elastomer and flexible foam formulations requiring a lower isocyanate functionality. The products having lower average functionalities are not sufficiently stable to storage owing to the separation of diphenylmethane diisocyanate crystals at low temperatures.

The pure form of diphenylmethane diisocyanate is obtained by distilling the aforesaid crude diphenylmethane diisocyanate compositions. In this specification, "pure" diphenylmethane diisocyanate means diphenylmethane diisocyanate that is substantially free from polymethylene polyphenyl polyisocyanates although it may be either a single compound or an isomer mixture.

When the crude material is distilled, the distillate consists largely of diphenylmethane-4,4'-diisocyanate with a smaller amount of the 2,4'-isomer and perhaps traces of the 2,2'-isomer. By further refining procedures, it is possible to obtain isomer mixtures having different compositions or, if desired, to separate the isomers as individual compounds.

Pure diphenylmethane diisocyanate, as defined above, is used in situations where a higher functionality polyisocyanate is not generally desirable, for example in the production of polyurethane elastomers, both of the non-cellular and microcellular types. Its use is somewhat limited, however, by its high melting point which makes it unsuitable for use in those polyurethane systems involving room temperature reactions.

Thus, the 4,4'-and 2,4'-isomers are both solids at room temperature, having melting points of 42° C. and 28° C. respectively, as are some of the commercially available isomer mixtures.

Various proposals have been put forward for converting pure diphenylmethane diisocyanate to a liquid isocyanate-containing composition which remains liquid when stored at a low temperature. In particular, it has been proposed, for example in our United Kingdom Patent Specification No. 1,378,975, to make isocyanate-containing prepolymers by reacting an excess of diphenylmethane diisocyanate with various alkylene glycols or mixtures of glycols.

The present invention provides liquid polyisocyanate compositions comprising:

(A) from 90 to 50% by weight of a reaction product of diphenylmethane diisocyanate and a polyoxyalkylene polyol having an average functionality of 2-3 comprising from 50-100% by weight of a polyoxypropylene diol or triol having a hydroxyl equivalent weight of from 750 to 3000 and from 0-50% by weight of a polyoxyethylene diol or triol having a hydroxyl equivalent weight of from 750 to 3000, said reaction product having an NCO content of from 8 to 26% by weight, and (B) from 10 to 50% by weight of a diphenylmethane diisocyanate composition containing from 30 to 65% by weight of diphenylmethane diisocyanate, the remainder being polymethylene polyphenyl polyisocyanates of functionality greater than two together with by-products formed in the manufacture of such polyisocyanates by phosgenation.

Component A of the compositions of the invention is a product of the type commonly known as prepolymers and may be prepared using conditions that have been described in the prior art for such preparations. Thus, the appropriate excess of diphenylmethane diisocyanate and the polyoxyalkylene polyol or mixture of such polyols may be reacted together at normal or elevated temperatures, until the reaction is substantially complete. Convenient reaction temperatures, from the viewpoint of speed of reaction and avoidance of side reactions, are in the range of 70°–90° C. Preferred NCO contents for the prepolymer are in the range 16–23% by weight.

The diphenylmethane diisocyanate used in making component A is pure diphenylmethane diisocyanate as hereinbefore defined. Thus it may be a single isomer or mixture of isomers. The preferred diphenylmethane diisocyanate contains from 70 to 100% of the 4,4'-isomer and from 0 to 30% of the 2,4'-isomer.

The polyoxyalkylene polyol used in making component A may be a polyoxypropylene diol or triol of the stated equivalent weight or a mixture of said polyoxypropylene diols and/or triols. Alternatively, up to 50% by weight of the polyoxypropylene polyol may be replaced by a polyoxyethylene diol or triol of the stated equivalent weight. Preferred polyoxylalkylene diols and triols have equivalent weights in the range 750 to 1250.

The prepolymers used in making the compositions of the invention are more stable at 0° C. than corresponding products made from low molecular weight glycols.

Component B of the compositions of the invention may be an unmodified crude diphenylmethane diisocyanate composition that has been made in the conventional manner or it may be a crude composition that has been modified by removal of some diisocyanate by distillation or crystallation.

Preferably, the compositions of the invention contain from 90 to 75% by weight of component A and from 10 to 25% by weight of component B.

The polyisocyanate compositions of the invention may be manufactured by mixing appropriate amounts of component A and component B in any convenient manner.

The polyisocyanate compositions of the invention are useful as isocyanate components in the manufacture of polyurethanes by reaction of the compositions with organic polyols under conventional conditions. In particular, cold cure flexible foams can be made by reacting the polyisocyanate compositions with a polyoxypropylene or poly(oxypropylene-oxyethylene) diol or triol having a hydroxyl equivalent weight in the range 700–2000 in the presence of from 1.0 to 4.5% by weight of water, based on the weight of reaction mixture. Conventional catalysts, surfactants and other additives may be employed.

Many cold cure flexible foams made from diphenylmethane diisocyanate exhibit surface defects by retaining indentations made therein for an excessive length of time. This undesirable effect is minimised when the polyisocyanate compositions of the present invention are used.

Other polyurethanes which can advantageously be made from the polyisocyanate composition of the invention include microcellular elastomers useful as shoe soles.

The invention is illustrated but not limited by the following Example in which all parts and percentages are by weight.

EXAMPLE

A polyol masterbatch is prepared by mixing 100 parts of an ethylene oxide tipped oxypropylated glycerol having an oxyethylene content of 14% and a molecular weight of 5300, 2.4 parts of water, 0.8 part of a 33% solution of triethylene diamine in dipropylene glycol, 0.3 part of a 70% solution of bis(2-dimethylaminoethyl)ether in dipropylene glycol, 0.1 part of dibutyltin dilaurate, 1.0 part of Silicone Oil B4113 and 5 parts of trichlorofluoromethane.

A polyisocyanate blend is made by mixing 16 parts of a crude diphenylmethane diisocyanate containing 55% of diisocyanatodiphenylmethane isomers and having an NCO content of 30.7% and 84 parts of a prepolymer having an NCO content of 18% made by reacting an 80:20 mixture of diphenylmethane-4,4'- and 2,4'-diisocyanates with polypropylene glycol of molecular weight 2000.

The polyol masterbatch and the polyol blend are mixed together at an isocyanate index of 105 and the reaction mixture is introduced into a mould heated to about 35° C. and allowed to cure for 6 minutes. When demoulded, the moulding is well cured and is very resistant to surface marking. Compression set after 75% compression for 22 hours at 70° C. is 11%.

A second polyisocyanate blend is made in which the above mentioned prepolymer is replaced by a prepolymer having an NCO content of 23% made by reacting an 80:20 mixture of diphenylmethane-4,4'- and 2,4'-diisocyanates with an equimolar mixture of propylene glycol, butylene glycol and diethylene glycol.

A moulding made by reacting the polyol masterbatch with the second polyisocyanate blend at an isocyanate index of 105 cures more slowly than the first moulding and has a surface which is very easily marked even when fully cured. Compression set after 75% compression for 22 hours at 70° C. is 71%.

We claim:

1. A liquid polyisocyanate composition comprising:
   (A) from 90 to 50% by weight of a reaction product of diphenylmethane diisocyanate and a polyoxyalkylene polyol having an average functionality of 2–3 comprising from 50–100% by weight of a polyoxypropylene diol or triol having a hydroxyl equivalent weight of from 750 to 3000 and fron 0–50% by weight of a polyoxyethylene diol or triol having a hydroxyl equivalent weight of from 750 to 3000, said reaction product having an NCO content of from 8 to 26% by weight, and
   (B) from 10 to 50% by weight of a diphenylmethane diisocyanate composition containing from 30 to 65% by weight of diphenylmethane diisocyanate, the remainder being polymethylene polyphenyl polyisocyanates of functionality greater than two together with by-products formed in the manufacture of such polyisocyanates by phosgenation.

2. A liquid polyisocyanate composition as claimed in claim 1 wherein the polyoxyalkylene polyol used in making component A has a hydroxyl equivalent weight of from 750 to 1250.

3. A liquid polyisocyanate composition as claimed in claim 1 or claim 2 which contains from 90 to 75% by weight of component A and from 10 to 25% of component B.

* * * * *